United States Patent [19]

Mahr et al.

[11] Patent Number: 5,581,061
[45] Date of Patent: Dec. 3, 1996

[54] MOTOR VEHICLE STEERING COLUMN SWITCH

[75] Inventors: Hermann Mahr, Waldalgesheim; Peter Kunz, Breitscheid, both of Germany

[73] Assignee: Eaton Controls GmbH & Co. KG, Langenlonsheim, Germany

[21] Appl. No.: 491,906

[22] PCT Filed: Nov. 4, 1994

[86] PCT No.: PCT/DE94/01315

§ 371 Date: Aug. 24, 1995

§ 102(e) Date: Aug. 24, 1995

[87] PCT Pub. No.: WO95/13936

PCT Pub. Date: May 26, 1995

[30] Foreign Application Priority Data

Nov. 16, 1993 [DE] Germany ............ 43 39 095.1

[51] Int. Cl.⁶ ............................................. H01H 9/00
[52] U.S. Cl. ..................................... 200/61.54; 200/61.27
[58] Field of Search ................... 200/61.27–61.38, 200/61.54–61.57, 293.1–307

[56] References Cited

U.S. PATENT DOCUMENTS 3,766,351 10/1973 Cryer .......................... 200/61.27 X
3,873,788 3/1975 Machalitzky et al. ............ 200/61.27

FOREIGN PATENT DOCUMENTS 4305827 9/1994 Germany ............... H01H 25/04

Primary Examiner—J. R. Scott
Attorney, Agent, or Firm—Spencer & Frank

[57] ABSTRACT

A switch assembly is provided for mounting on an end of a steering column sheath in which is disposed a motor vehicle steering column. The switch assembly includes a plurality of individual switches. Each switch comprises a housing with electrical connectors and an actuating element. At least first and second switches of the switch assembly include cooperating guide means including a spring and a releasable clip connector so that the second switch can be slid onto the first switch against the force of the spring and fixed in an end position by the releasable clip connector.

11 Claims, 3 Drawing Sheets

MOTOR VEHICLE STEERING COLUMN SWITCH

BACKGROUND OF THE INVENTION

The invention relates to a motor vehicle steering column switch, which is disposed on the end of a steering column sheath, which receives the steering column, and has a plurality of individual switches, each comprising a housing with electrical connectors and an actuating element.

In a steering column switch known from DE 43 05 827 A1, which was not published before the priority date of the present application, the individual switches are all fastened to a carrier plate. Each individual switch is slid onto the carrier plate via corresponding guide means, which are provided both on the carrier plate and on the individual switch, and affixed by a releasable clip connector. For the fastening of a plurality of individual switches, the carrier plate must have sufficient room to embody all guide means as well as clip connectors. This goes for the fastening of individual switches both on the periphery of the carrier plate and in the depths of the carrier plate, that is in the direction of the course of the steering column. As a result of these requirements, the carrier plate is very large, and this is reflected in the tools and the tool costs connected with them. In individual switches, which are fastened to the carrier plate behind one another, sufficient intermediate space must be available for assembly, by means of which the structural size is further increased. In the course of stabilizing, the carrier plate installed in the vehicle is designed so that a maximal configuration with individual switches is possible. As a result, a large carrier plate is always installed, which takes up a lot of space, even when the guide means are not occupied. Due to the maximal carrier plate, the heaviest embodiment is also always in the vehicle, which contradicts efforts to reduce weight.

SUMMARY OF THE INVENTION

A object of the invention is to provide a steering column of the type mentioned at the beginning, in which individual switches, without the aid of a tool, can be quickly and easily connected to one another, without play, and detached again without altering the carrier plate.

This object is attained, according to the invention, by the provision of a switch assembly for a steering column wherein at least one individual switch can be slid onto another individual switch against the force of a spring by the cooperation of corresponding guide means and is fixed in its end position by a releasable clip connector.

According to an advantageous improvement of the invention, the one individual switch is fastened on the end of the steering column sheath and the other individual switch can be slid as a slide-on switch onto the housing of the base switch. Consequently, the base switch occupies the space on the steering column sheath or its carrier plate and is fixed there. No additional space or additional guide means is required on the carrier plate for the slide-on switch, by means of which the carrier plate can be small and the number of carrier plates can be kept low.

It is furthermore preferable that at least one sliding block is provided on the slide-on switch, which engages a groove of the base switch. Integrating the groove in the base switch is advantageous insofar as there are no protruding shaped elements behind which electrical lines or other elements provided on the steering column can get caught.

According to a further advantageous embodiment of the subject of the invention, two sliding blocks of the slide-on switch, which are virtually the same length as the housing of the base switch and are supported on the housing via tabs, are provided on ribs on the housing of the slide-on switch, to prevent catching of the electrical lines and for upgrading with an improved embodiment of the guide.

In an advantageous improvement of the invention, each sliding block of the slide-on switch is embodied as T-shaped. The face between the rib and the head of the sliding block is as sloped. Furthermore, the groove of the base switch functionally comprises walls formed perpendicular to the housing and one angle element running perpendicular to each wall, with the angle elements oriented toward one another. The inner surface between wall and angle element is sloped, and the wall and the angle element are joined together on one end of the groove. This embodiment of paired shaped elements guarantees good induction of force into the housing and a precise fit tolerance, and prevents the incorrect insertion of the shaped elements.

In order to obtain a play-free clip connection, it is further preferably provided that the spring, which is embodied as a coil spring, is inserted in captive fashion into a blind bore in the housing of the slide-on switch.

According to an advantageous improvement of the invention, one wall of the blind bore has a slot, which runs axially to the blind bore. In this case, the opposite or countersupport of the coil spring can be kept short.

According to an advantageous improvement of the invention, the opposite support is embodied by the fact that a projection in the shape of a truncated cone is attached to the housing of the base switch. When the clip connection is produced, this projection protrudes into the slot of the blind bore in the housing of the slide-on switch and compresses the spring.

According to a further advantageous embodiment of the invention, the clip connector has a resilient clip arm with a clip nose, which engages behind a shoulder of a clip rib. According to an advantageous improvement of the invention, the resilient clip arm of the clip connector is disposed on the housing of the slide-on switch and the clip rib with the shoulder is disposed on the housing of the base switch in order to make possible a cost effective production of the clip elements as well as a release of the clip connection by hand. The resilient clip arm has a release lever, which protrudes into an empty space via the shoulder of the clip rib.

The concept underlying the invention is explained in the description below from an exemplary embodiment which is shown in the drawing.

DETAILED DESCRIPTION OF THE PREFERRED EMBODIMENTS

Figure 1:
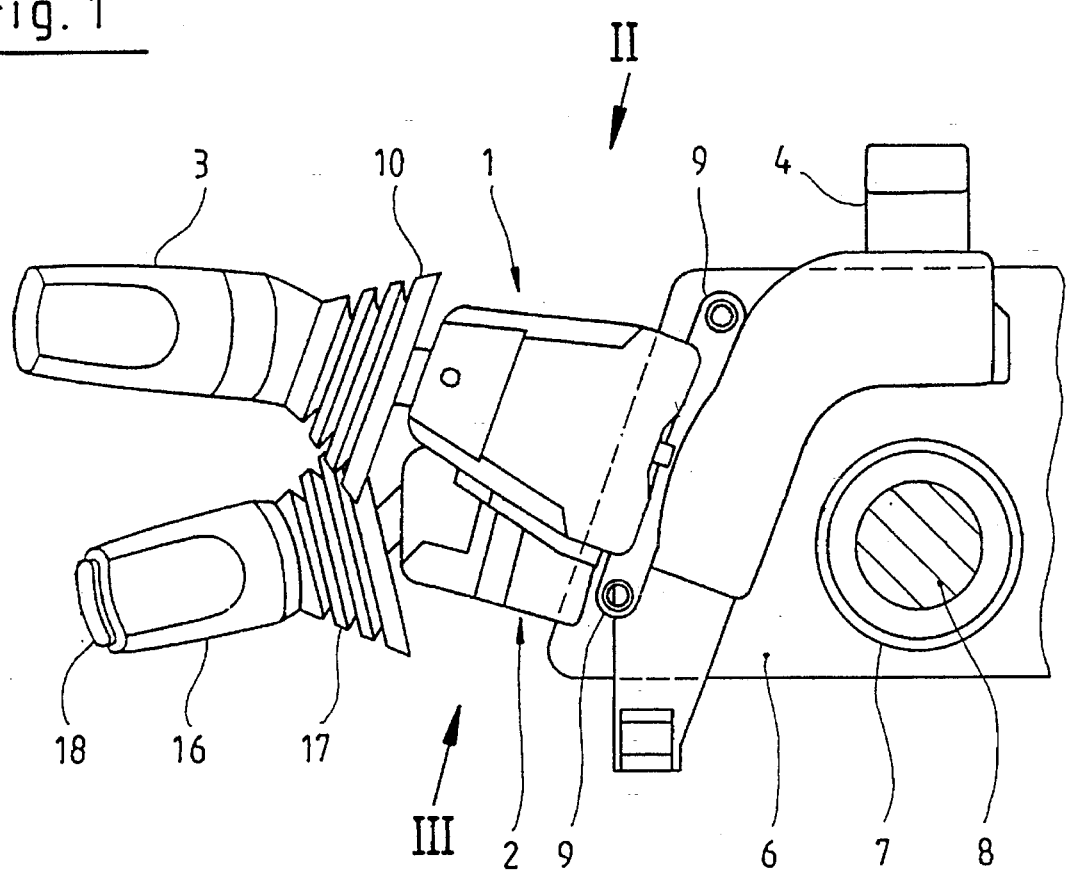
FIG. 1 shows a top view of a steering column switch with steering column sheath, steering column, and carrier plate.

The steering column switch includes two individual switches: a base switch 1 and a slide-on switch 2. The base switch 1 has an actuating lever 3 and a push button 4. The housing 5 of the base body 1 is laid out as angled and is disposed over a carrier plate 6, which is fastened to the steering column sheath 7. The steering column 8 is supported in the steering column sheath 7. The base switch 1 is fastened to the carrier plate 6 via screw fastening eyes 9. On the actuating lever 3 of the base switch 1, there is an elastic cuff 10, which covers the entry opening of the actuating lever 3 into the housing 5 of the base switch 1. Sleeves 11, which are longer than the screw fastening eyes 9 of the housing 5, are inserted into the screw fastening eyes 9. An encompassing collar 12 is formed on the side of the housing 5 of the base switch 1, opposite from the actuating lever 3, which collar protects the electrical connectors 13.

Figure 2:
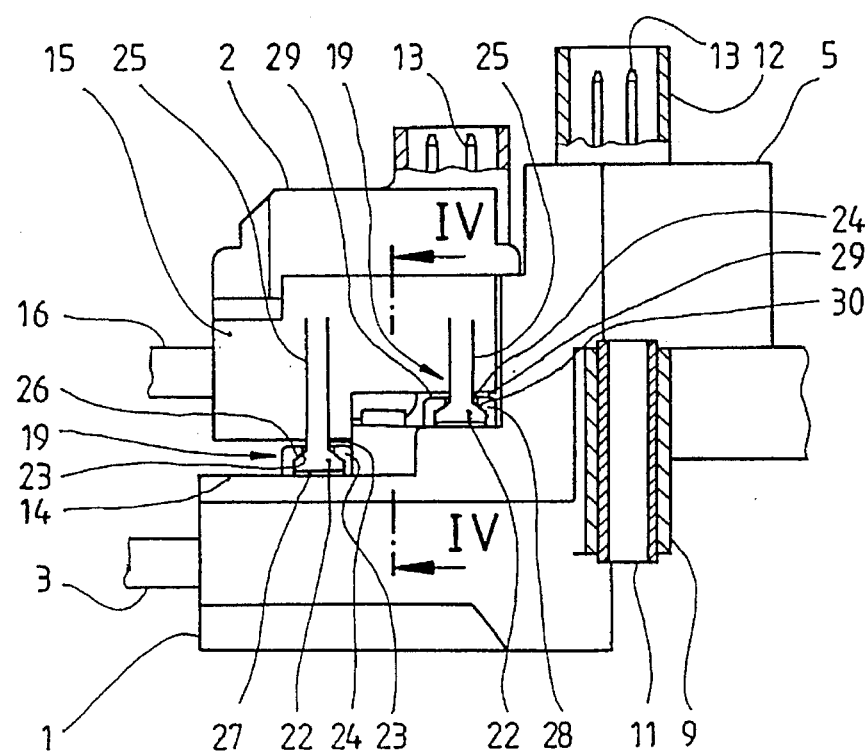
FIG. 2 shows a view of the steering column switch according to FIG. 1 in the direction of the arrow II with partial sections.
Figure 3:
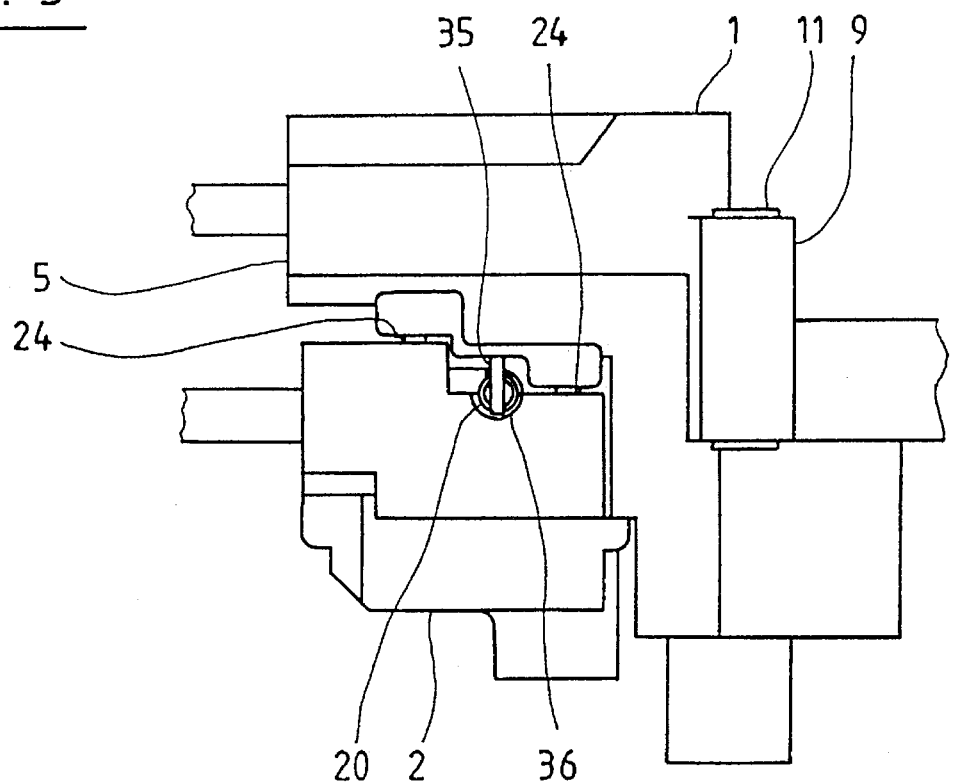
FIG. 3 shows a view of the steering column switch according to FIG. 1 in the direction of the arrow III.
Figure 4:
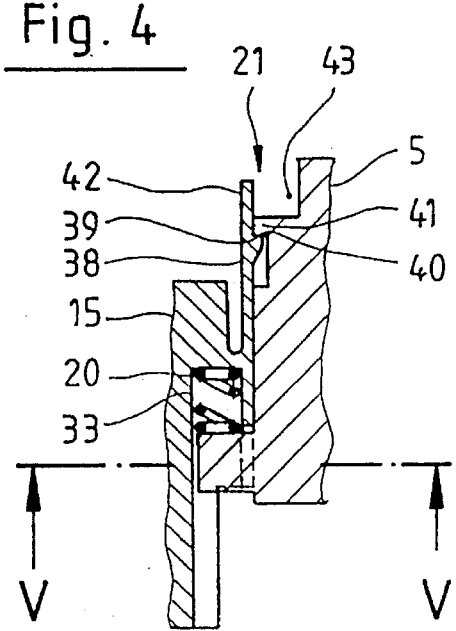
FIG. 4 shows a partial section according to FIG. 2 in the direction of the arrows IV—IV.
Figure 5:
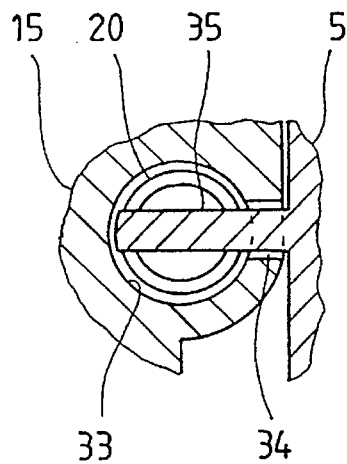
FIG. 5 shows an enlargement of a section through FIG. 4 in the direction of the arrows V—V.
Figure 6:
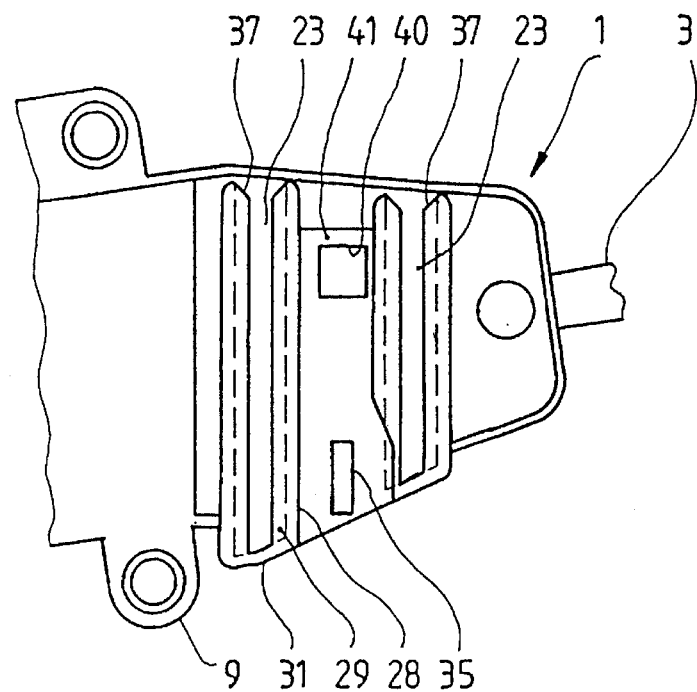
FIG. 6 shows a view of the base switch viewed toward the connecting elements.
Figure 7:
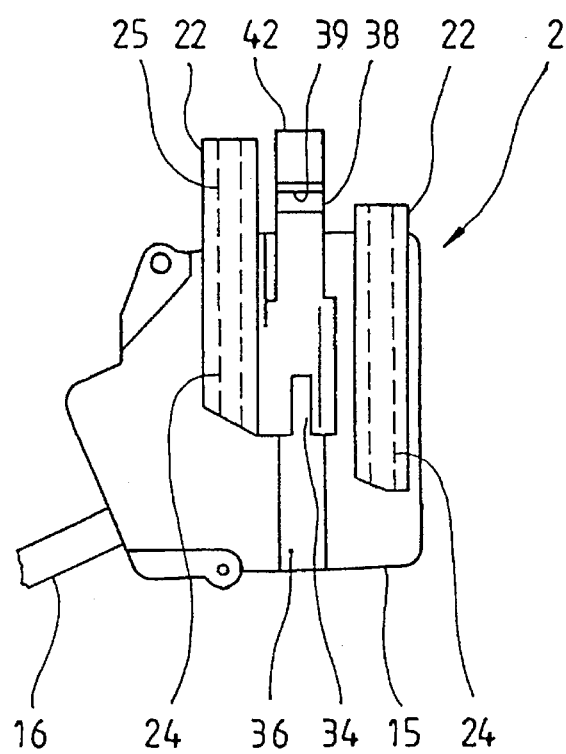
FIG. 7 shows a view of the slide-on switch viewed toward the connecting elements.

As can be seen in FIG. 2, the back end 14 of the housing 5 has a stepped configuration. The housing 15 of the slide-on switch 2 also has a stepped configuration that compliments the shape of housing 14. Furthermore, the slide-on switch 2 has an actuating element 16 with an affiliated cuff 17. In the frontal region, the actuating element 16 has a further push button 18. The base switch 1 and the slide-on switch 2 are each individual switches, which can slide onto each other by the cooperation of corresponding guide means 19 against the force of a spring 20. The end position is fixed by a releasable clip connector 21.

The individual switch used as the base switch 1 is fastened to the end of the steering column sheath 7. The individual switch, which is embodied as the slide-on switch 2, can be slid onto the housing 5 of the base switch 1. At least one sliding block 22 is provided on the slide-on switch 2 and engages a groove 23 of the base switch 1.

Ribs 24 are provided on the housing 15 of the slide-on switch and carry two sliding blocks 22. The sliding blocks 22 are virtually the same length as the housing 5 of the base switch 1. The protruding region of the sliding blocks 22 is supported on the housing 15 of the slide-on switch 2 via tabs 25. Each sliding block 22 of the slide-on switch 2 is T-shaped. The face 26 between the rib 24 and the head 27 of the sliding block is embodied as sloped. Each groove 23 of the base body 1 comprises walls 28 formed perpendicular to the housing 5 and an angle element 29 running perpendicular to each wall 28. The angle elements 29 are oriented toward one another. The inner surface 30 between wall 28 and angle element 29 is made in its slope to fit the course of the face 26 of the sliding block 22. On one end 31 of the groove 23, the wall 28 and the angle element 29 are connected.

Between the housing 5 of the base switch 1 and the housing 15 of the slide-on switch 2, a spring 20, which is embodied as a coil spring, is inserted in captive fashion into a blind bore 33 in the housing 15 of the slide-on switch 2. The spring 20 is secured in captive fashion by means of a star-shaped nipple on the bottom of the blind bore 33 or by means of wedge-shaped points on the circumference of the blind bore 33, which means are not shown. In the wall toward the housing of the base switch 1, the blind bore 33 has a slot 34 which is axial with the blind bore 33. A projection 35 in the shape of a truncated cone is provided on the housing 5 of the base switch 1. When the clip connector 21 is brought together, the projection 35 in the shape of a truncated cone protrudes into a slot 34 of the blind bore 33 in the housing 15 of the slide-on switch 2 and compresses the spring 20. A half shell 36 is let into the housing 15 of the slide-on switch 2 for the insertion of the spring 20 into the blind bore 33. The ends of the sliding blocks 22 and the grooves 23 are matched to one another in slope. For greater ease in inserting the guide means 19, insert bevels 37 are provided on the grooves 23.

The clip connector 21 includes a resilient clip arm 38 with an affiliated clip nose 39, which engages behind a shoulder 40 of a clip rib 41. The resilient clip arm 38 for the clip connector 21 is disposed on the housing 15 of the slide-on switch 2. The clip rib 41 with the shoulder 40 is disposed on the housing 5 of the base switch 1. When the guide means 19 are slid together, the projection 35 engages the slot 34 and slides the spring 20 so that it compresses. At the same time, the resilient clip arm 38 slides along on the housing 5 of the base switch 1, moves out of the way of the housing 5 of the base switch 1, and engages with its clip nose 39 behind the shoulder 40. The resilient clip arm 38 has a release lever 42, which protrudes into an empty space 43 via the shoulder 40 of the clip rib 41. To release the clip connector 21, the resilient arm 38 is moved at its release lever 42 in the direction of the slide-on switch 2. The clip nose 39 releases from the shoulder 40, the spring 20 presses the guide means 19 of the base switch 1 and the slide-on switch 2 apart from each other until the clip connector 21 is released. The clip connector 21 can be reinstated by pushing the base switch 1 and the slide-on switch 2 together.

We claim:

1. A switch assembly for mounting on an end of a steering column sheath in which is disposed a motor vehicle steering column, comprising: a plurality of individual switches, each switch comprising a housing with electrical connectors and an actuating element, wherein at least first and second switches of the switch assembly include cooperating guide means including a spring and a releasable clip connector so that the second switch can be slid onto the first switch against the force of the spring and fixed in an end position by the releasable clip connector.

2. The switch assembly according to claim 1, wherein the first switch is fastened on the end of the steering column sheath and constitutes a base switch, and the second switch slides onto the housing of the base switch and constitutes a slide-on switch.

3. The switch assembly according to claim 2, wherein the base switch includes a groove and the slide-on switch includes at least one sliding block which engages in the groove of the base switch.

4. The switch assembly according to claim 3, wherein the housing of the slide-on switch includes ribs, the at least one sliding block includes two sliding blocks disposed on the ribs and is about the same length as the housing of the base switch, and the assembly further including tabs supporting the sliding blocks on the housing of the slide-on switch.

5. The switch assembly according to claim 4, wherein each sliding block of the slide-on switch is T-shaped and has a head, and a face disposed between the rib and the head which is sloped.

6. The switch assembly according to claim 2, wherein the groove of the base switch comprises walls formed perpendicular to the housing of the base switch, an angle element running perpendicular to each wall, with the angle elements being oriented toward one another, and an inner surface between a respective wall and angle element runs at a slope, the walls and the angle elements being joined together on one end of the groove.

7. The switch assembly according to claim 1, wherein the housing of the slide-on switch includes a blind bore and the spring is a coil spring inserted in a captive fashion into the blind bore.

8. The switch assembly according to claim 7, wherein one wall of the blind bore has a slot which runs axial to the blind bore.

9. The switch assembly according to claim 8, wherein the housing of the base switch includes a projection in the shape of a truncated cone which protrudes into the slot of the blind bore in the housing of the slide-on switch and compresses the spring when the slide-on switch is slid onto the base switch.

10. The switch assembly according to claim 1, wherein the clip connector includes a clip rib presenting a shoulder, and a resilient clip arm with a clip nose which engages behind the shoulder.

11. The switch assembly according to claim 10, the resilient clip arm of the clip connector is disposed on the housing of the slide-on switch and the clip rib with the shoulder is disposed on the housing of the base switch, wherein the resilient clip arm has a release lever which protrudes into an empty space via the shoulder of the clip rib.

\* \* \* \* \*